(12) United States Patent
Kawasaki

(10) Patent No.: US 8,467,116 B2
(45) Date of Patent: Jun. 18, 2013

(54) APPARATUS, PROGRAM PRODUCT, AND METHOD FOR CREATING AND PRINTING A COMPOSITE IMAGE INCLUDING AN ADDITIONAL IMAGE ASSOCIATED WITH EXTERNALLY ACQUIRED SOFTWARE

(75) Inventor: Tomohiro Kawasaki, Osaka (JP)

(73) Assignee: Kyocera Document Solutions Inc. (JP)

( * ) Notice: Subject to any disclaimer, the term of this patent is extended or adjusted under 35 U.S.C. 154(b) by 294 days.

(21) Appl. No.: 13/091,480

(22) Filed: Apr. 21, 2011

(65) Prior Publication Data

US 2011/0261375 A1    Oct. 27, 2011

(30) Foreign Application Priority Data

Apr. 23, 2010    (JP) ................................. 2010-099821

(51) Int. Cl.
*H04N 1/60*    (2006.01)
*G06F 17/24*    (2006.01)
*G06F 9/44*    (2006.01)

(52) U.S. Cl.
USPC ........... 358/518; 358/523; 358/504; 715/231; 717/168

(58) Field of Classification Search
USPC ........ 358/1.9, 504, 518–523, 450, 1.13–1.15, 358/3.23; 382/167, 284; 715/230–233; 717/168–178
See application file for complete search history.

(56) References Cited

U.S. PATENT DOCUMENTS

| | | | |
|---|---|---|---|
| 5,768,495 A * | 6/1998 | Campbell et al. | 358/1.1 |
| 7,227,656 B1 * | 6/2007 | Kato | 358/1.15 |
| 8,223,404 B2 * | 7/2012 | Kawasaki | 358/3.23 |
| 2002/0067504 A1 * | 6/2002 | Salgado et al. | 358/1.15 |
| 2003/0184777 A1 | 10/2003 | Ikeno | |
| 2004/0207868 A1 * | 10/2004 | Lay et al. | 358/1.15 |
| 2006/0119884 A1 * | 6/2006 | Choi | 358/1.15 |
| 2009/0201552 A1 | 8/2009 | Ikeno | |

FOREIGN PATENT DOCUMENTS

| | | |
|---|---|---|
| JP | 64-080574 | 3/1989 |
| JP | 2003-296079 | 10/2003 |
| JP | 2007-115125 | 5/2007 |

* cited by examiner

*Primary Examiner* — Scott A Rogers
(74) *Attorney, Agent, or Firm* — McDonnell Boehnen Hulbert & Berghoff LLP

(57) ABSTRACT

An image forming apparatus includes an additional image creating unit, a composite image creating unit, and a printing unit. The additional image creating unit is configured to create an additional image by using information associated with externally acquired software data if the externally acquired software data comprises specific software data. The composite image creating unit is configured to create a composite image in which the additional image and an image of an original are composited. The printing unit is configured to print the composite image.

21 Claims, 8 Drawing Sheets

TRIAL-VERSION TARGET LIST

| ID 1 | cLUT |
|---|---|
| ID 2 | Screen |
| NUMBER OF TARGETS | 2 |
| IDENTIFICATION NAME | TEST |

FIG. 3A

ADDITIONAL INFORMATION FOR TRIAL-VERSION PRINTING

| CATEGORY | cLUT |
|---|---|
| PRESENCE/ABSENCE OF THE TRIAL-VERSION | PRESENCE |
| VERSION NAME | ColorTable_TEST1 |
| PRINTING POSITION | (100, 100) |
| FONT INFORMATION | Times New Roman |
| | RGB=(128, 128, 128) |
| | 11pts |
| ADDITIONAL IMAGE ADDRESS | 0x80000 |

| CATEGORY | Screen |
|---|---|
| PRESENCE/ABSENCE OF THE TRIAL-VERSION | — |
| VERSION NAME | — |
| PRINTING POSITION | (100, 200) |
| FONT INFORMATION | Times New Roman |
| | RGB=(128, 128, 128) |
| | 11pts |
| ADDITIONAL IMAGE ADDRESS | 0xA0000 |

FIG. 3B

APPARATUS, PROGRAM PRODUCT, AND METHOD FOR CREATING AND PRINTING A COMPOSITE IMAGE INCLUDING AN ADDITIONAL IMAGE ASSOCIATED WITH EXTERNALLY ACQUIRED SOFTWARE

REFERENCE TO RELATED APPLICATIONS

This application is based upon and claims the benefit of priority from the corresponding Japanese Patent Application No. 2010-099821, filed in the Japan Patent Office on Apr. 23, 2010, the entire contents of which is incorporated herein by reference.

BACKGROUND

1. Technical Field

The present disclosure relates to image processing based on a downloaded color look-up table (cLUT) or screen pattern.

2. Description of the Related Art

A user of a typical image forming apparatus can express a desired color tint and gradation by downloading a new cLUT or screen pattern via a network, a USB interface, or the like.

For example, as illustrated in FIG. 8, a customer service center of a dealer of a color printer, which has received a user's request to adjust a color tint, may request an engineer in charge in a printer manufacturer to create a custom cLUT (S1).

In this case, the engineer in charge distributes a plurality of trial-version cLUTs (ColorTable_TEST1 to ColorTable_TEST3) (S2). The customer service center of the dealer selects one of the trial-version cLUTs (S3). The customer service center of the dealer further delivers the selected trial-version cLUT to a service person or delivers the plurality of trial-version cLUTs to the service person (S4). Since there are often several prepared cLUTs that exhibit similar color tints, the plurality of trial version cLUTS are provided, so that the user himself/herself can select the intended one.

The service person who has received the trial-version cLUTs visits the user, downloads the trial-version cLUTs, and outputs the respective print results. The user references those print results to thereby select one of the cLUTs. In general, the selected cLUT is introduced as a full-version cLUT after being tried out by the user for a fixed period.

Incidentally, the existing cLUT may need to be revised after that by the user's request or for another reason. In that case, a technical department prepares a new cLUT corresponding to the existing cLUT. However, the trial-version cLUT requires much time and labor for management thereof and tends to cause an error in the management because the trial-version cLUT is individually prepared every time the user makes a request.

Therefore, in some cases, the technical department is not able to grasp which of the trial-version cLUTs has been introduced as the full-version cLUT. As a result, it must prepare respectively new cLUTs corresponding to all of trial-version cLUTS, ColorTable_TEST1 to ColorTable_TEST3.

SUMMARY

An image forming apparatus according to the present disclosure includes an additional image creating unit, a composite image creating unit, and a printing unit. The additional image creating unit is configured to create an additional image by using information associated with externally acquired software data if the externally acquired software data comprises specific software data. The composite image creating unit is configured to create a composite image in which the additional image and an original image are composited. The printing unit is configured to print the composite image.

A non-transitory computer-readable recording medium according to the present disclosure stores an image forming program code executed by a computer of an image forming apparatus. The image forming program code includes first to third sub-program codes. The first sub-program code causes the computer to create an additional image by using information associated with externally acquired software data if the externally acquired software data comprises specific software data. The second sub-program code causes the computer to create a composite image in which the additional image and an original image are composited. The third sub-program code causes the computer to print the composite image.

An image forming method according to the present disclosure includes: (i) an additional image creating unit creating an additional image by using information associated with externally acquired software data if the externally acquired software data comprises specific software data; (ii) a composite image creating unit creating a composite image in which the additional image and an original image are composited; and (iii) a printing unit printing the composite image.

Additional features and advantages are described herein, and will be apparent from the following Detailed Description and the figures.

BRIEF DESCRIPTION OF THE DRAWINGS

In the accompanying drawings:

FIG. 3A shows an example of a trial-version target list;

FIG. 3B shows an example of additional information for trial-version printing;

DETAILED DESCRIPTION

Hereinafter, a color printer, which is an image forming apparatus according to an embodiment of the present disclosure, is described with reference to the accompanying drawings.

Figure 1:
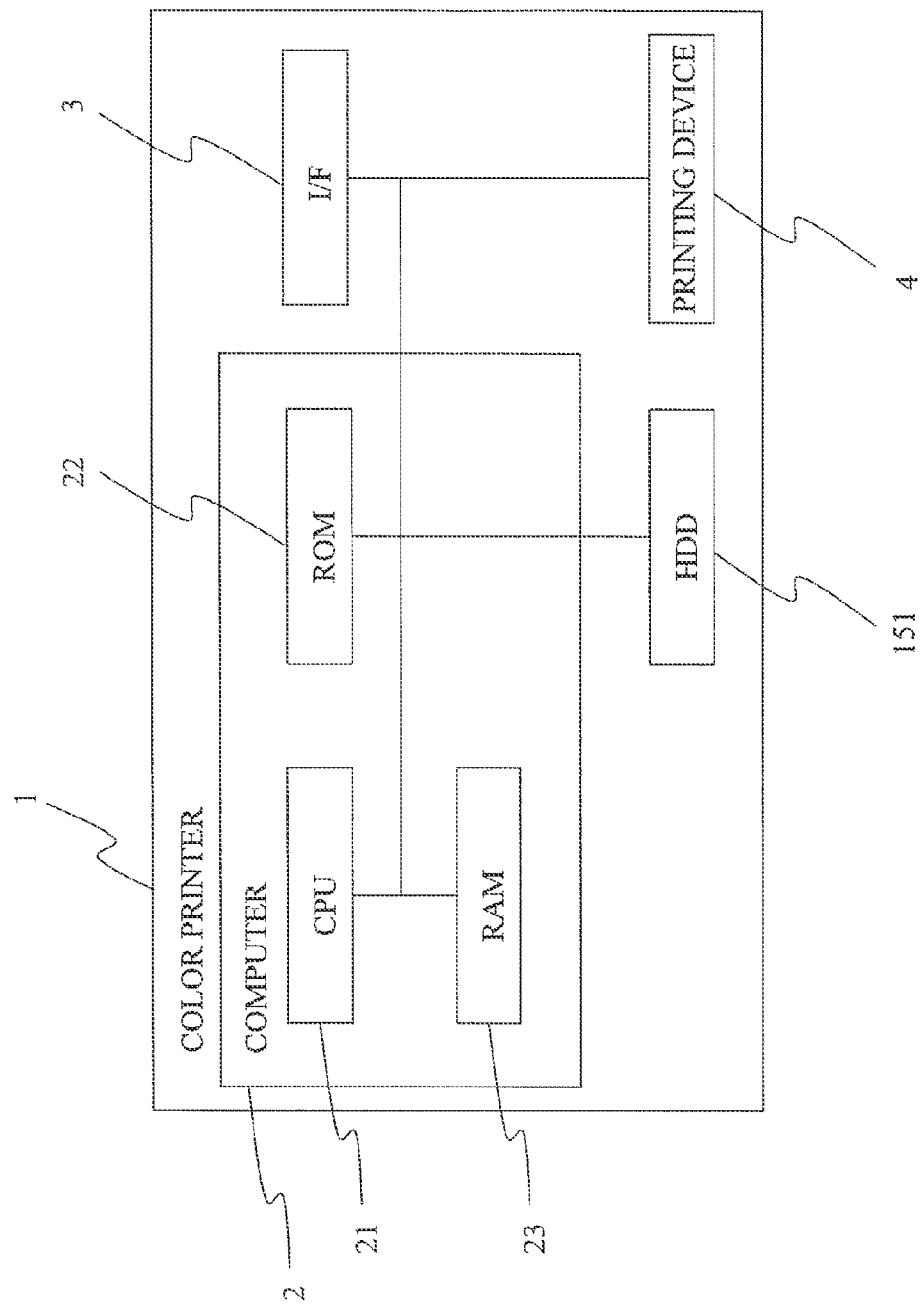
FIG. 1 illustrates a hardware architecture of a color printer according to an embodiment of the present disclosure.

FIG. 1 illustrates a hardware architecture of the color printer according to the embodiment of the present disclosure. Color printer 1 includes computer 2, hard disk drive (HDD) 151, interface (I/F) 3, and printing device 4.

Computer 2 includes central processing unit (CPU) 21, read only memory (ROM) 22, and random access memory (RAM) 23. CPU 21 is a processor that executes an image processing program. ROM 22 is a nonvolatile memory that stores a program and data. RAM 23 is a memory that temporarily stores the program and data and is used as a work area when the program is executed. An image forming program stored in ROM 22 is executed by being read by CPU 21. At this time, according to the image forming program, CPU 21 operates a drawing processing unit, an output image forming unit, a download control unit, and a trial-version information control unit, which are described later.

I/F 3 receives print data such as page description language data (PDL data) from a personal computer or a portable memory such as a universal serial bus memory (USB memory).

Printing device 4 has a mechanism for respectively charging, developing, transferring, and fixing. In more detail, printing device 4 has a mechanism for performing a printing processing by forming a toner image of a bitmapped image on a transferring member, transferring the toner image onto print paper or the like, and performing a fixing processing thereon.

According to the image forming program, CPU 21 sends an instruction to the respective components of the color printer to cause I/F 3, RAM 23, and printing device 4 to operate as a page description language receiving unit (PDL receiving unit), a drawing memory, and a printing unit, respectively.

Figure 2:
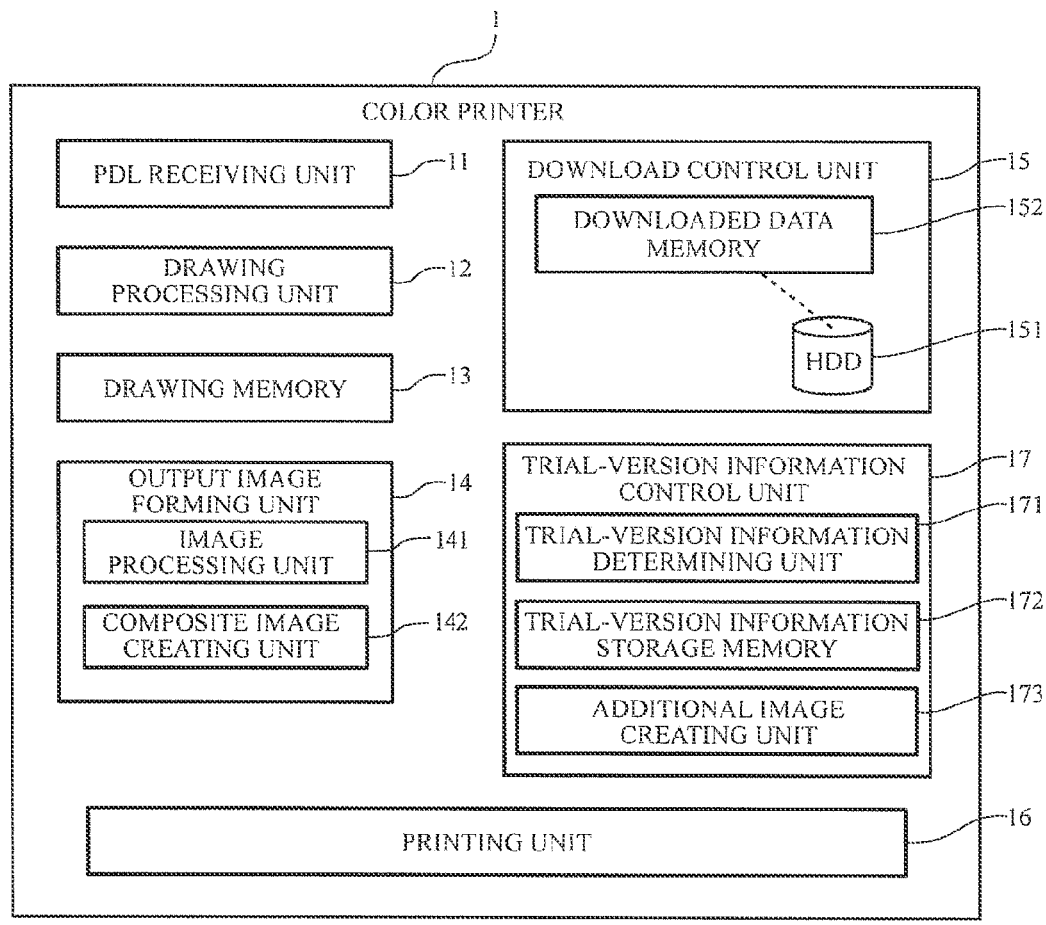
FIG. 2 shows a block diagram illustrating a schematic configuration of the color printer according to the embodiment of the present disclosure.

FIG. 2 shows a block diagram illustrating a schematic configuration of the color printer according to the embodiment of the present disclosure.

As illustrated in FIG. 2, color printer 1 according to this embodiment includes PDL receiving unit 11, drawing processing unit 12, drawing memory 13, output image forming unit 14, download control unit 15, printing unit 16, and trial-version information control unit 17.

PDL receiving unit 11 includes an interface that receives the print data such as PDL data of an original from the personal computer or the portable memory such as the USB memory. PDL receiving unit 11 interprets the received PDL data, and calls a drawing command corresponding to interpreted contents.

Drawing processing unit 12 generates the bitmapped image for the PDL data of the original, i.e., an original image according to the drawing command.

Drawing memory 13 is a volatile memory such as a RAM. Drawing memory 13 temporarily stores the bitmapped image generated by drawing processing unit 12.

Output image forming unit 14 includes image processing unit 141 and composite image creating unit 142. Image processing unit 141 extracts the bitmapped image stored in drawing memory 13 to perform a color conversion processing or a screen processing. The color conversion processing or the screen processing is performed by using a color look-up table (cLUT) or screen pattern (hereinafter, referred to as "original cLUT or the like") stored in a recording medium (not shown). Here, the cLUT refers to a so-called color conversion table that converts, for example, an RGB color system as an input value into a CMYK color system as an output value.

Further, composite image creating unit 142 creates a composite image by compositing the bitmapped image of an additional image, which is described later, and the bitmapped image for the PDL (original image).

Download control unit 15 can switch the original cLUT or the like to a new cLUT or the like by downloading software data such as a new cLUT or screen pattern from an external portion, e.g., the personal computer or the portable memory such as a USB memory.

Download control unit 15 stores the software data that has been downloaded from the external portion via PDL receiving unit 11 in the storage medium. In this embodiment, hard disk drive (HDD) 151 is used as the storage medium. The storage medium is not limited to HDD 151, and maybe a nonvolatile memory such as a NAND-type flash memory as long as data is not erased when power is turned on/off and is not erased even when other data on a print controller or the like is rewritten.

Note that, as illustrated in FIG. 2, the storage media may be properly used so that the software data is usually stored in HDD 151 and at the time of execution thereof, the software data is used by being temporarily read into downloaded data memory 152. Downloaded data memory 152 is a readable/writable storage medium, such as a RAM, a NAND-type flash memory, or the like.

If the software data such as the cLUT or screen pattern is stored in the storage medium such as HDD 151, image processing unit 141 may perform the color conversion processing on the bitmapped image extracted from drawing memory 13 via the cLUT, or may perform the screen processing thereon via the screen pattern. Then, image processing unit 141 outputs the bitmapped image subjected to such an image processing to printing unit 16.

Printing unit 16 includes a printing device having the mechanism for respectively charging, developing, transferring, and fixing. Printing unit 16 performs the printing processing on the print paper or the like based on the bitmapped image output from image processing unit 141.

Trial-version information control unit 17 forms the additional image for indicating that a trial-version cLUT or screen pattern has been downloaded if the specific software data such as that cLUT or screen pattern has been downloaded. Trial-version information control unit 17 includes trial-version information determining unit 171, trial-version information storage memory 172, and additional image creating unit 173.

Trial-version information determining unit 171 functions as a specific data determining unit that determines whether or not the software data such as the cLUT or screen pattern that has been downloaded from the external portion by download control unit 15 is a trial version.

Specifically, trial-version information determining unit 171 extracts a version name attached to (associated with) the software data that is stored in HDD 151, and determines whether or not specific identification information is included therein. In this embodiment, the text "TEST" (meaning a trial version) is set as the specific identification information. Trial-version information determining unit 171 determines that the software data is the trial version if the specific identification information is included therein, and determines that the software data is not the trial version (that is, determines that the software data is a full version) if the specific identification information is not included therein.

As an actual operation, it is determined whether or not the software data included in a trial-version target list, which is described later, is stored in HDD 151.

Trial-version information storage memory 172 stores the trial-version target list and additional information for trial-version printing. The trial-version target list mainly includes information on the software data to be subjected to trial-version determination. The additional information for trial-version printing includes determination results from trial-version information determining unit 171 along with information for printing the additional image.

Additional image creating unit 173 creates the additional image from the contents of trial-version software data, for example, the version name. In more detail, additional image creating unit 173 requests drawing processing unit 12 to create the additional image regarding target software data included in the trial-version target list. Along with the request, additional image creating unit 173 notifies drawing processing unit 12 of the corresponding information included in the additional information for trial-version printing.

FIG. 3A shows an example of the trial-version target list. FIG. 3B shows an example of the additional information for trial-version printing.

As shown in FIG. 3A, the trial-version target list includes the contents of the target software data associated with the IDs, the number of targets of the software data, and an identification name as identification information used for trial-version information determination.

As shown in FIG. 3B, the additional information for trial-version printing includes a printing position (100,100) of the additional image and font information for printing (Times New Roman, RGB=(128,128,128), and size (11 pts)) as the information for printing regarding the additional image for the trial-version cLUT. The additional information for trial-version printing further includes a printing position (100,200) of the additional image and font information for printing (Times New Roman, RGB=(128, 128, 128), and size (11 pts)) as the information for printing regarding the additional image for a trial-version screen pattern.

Further, presence/absence of the trial-version software data based on the determination performed by the trial-version information determining unit and version information on the trial-version software data are added later.

As shown in FIG. 3A, the trial-version target list includes the values "cLUT" and "Screen". Therefore, the additional image creating unit can recognize the trial-version cLUT and the trial-version screen pattern as targets for which the additional image is to be created.

Here, as shown in the additional information for trial-version printing of FIG. 3B, the "presence/absence of trial version" of the "cLUT" is "PRESENCE". Therefore, the additional image creating unit requests the drawing processing unit to create the additional image regarding the trial-version cLUT. At this time, the additional image creating unit extracts the version name, printing position, and font information from the additional information for trial-version printing, and notifies the drawing processing unit of those kinds of information.

On the other hand, the presence/absence of trial version of the "Screen" is "–" (symbol representing null), and hence the additional image creating unit does not make a request to create the additional image regarding the trial-version screen pattern.

The drawing processing unit that has been requested to create the additional image by the additional image creating unit creates the bitmapped image for the additional image from character information on the version name based on the printing position and font information.

Figure 4:
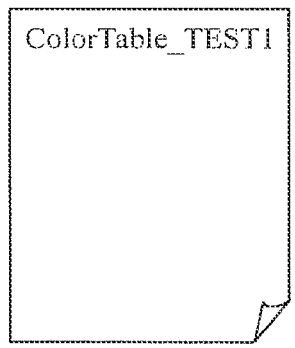
FIG. 4 illustrates an example of an additional image for trial-version printing.

FIG. 4 illustrates an example of the additional image used for trial-version printing. Based on the request made by the additional image creating unit, the drawing processing unit creates the additional image exemplified in FIG. 4 by preparing the character information that reads "ColorTable_TEST1" in Times New Roman, 11 pts and locating the character information in printing coordinates (100,100).

The bitmapped image for the additional image that has been created is temporarily stored in the drawing memory. The composite image creating unit composites the bitmapped image for the additional image that has been stored and the bitmapped image for the PDL data that has been created based on the PDL data. The printing unit prints the composite image on the print paper or the like.

Figure 5A:
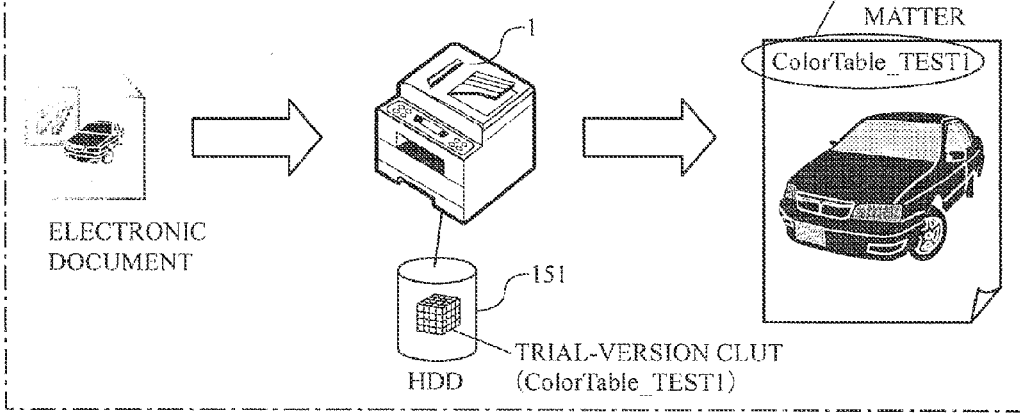
FIG. 5A is a conceptual illustration of an example of data output when a trial-version cLUT has been downloaded.
Figure 5B:
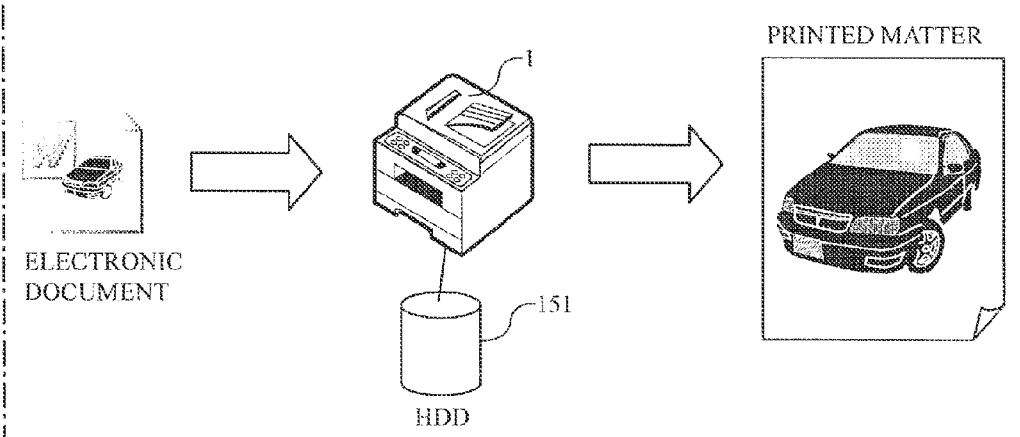
FIG. 5B is a conceptual illustration of data output when no trial-version cLUT has been downloaded.

For example, as illustrated in FIG. 5A, an image (original image) expressed by an electronic document (original) and the version name (additional image) of the trial-version cLUT are printed on one print paper sheet. In contrast, if none of the trial-version software data including the trial-version cLUT has been downloaded (stored in HDD 151), as illustrated in FIG. 5B, only the original image expressed by the electronic document is printed on the print paper.

Figure 6:
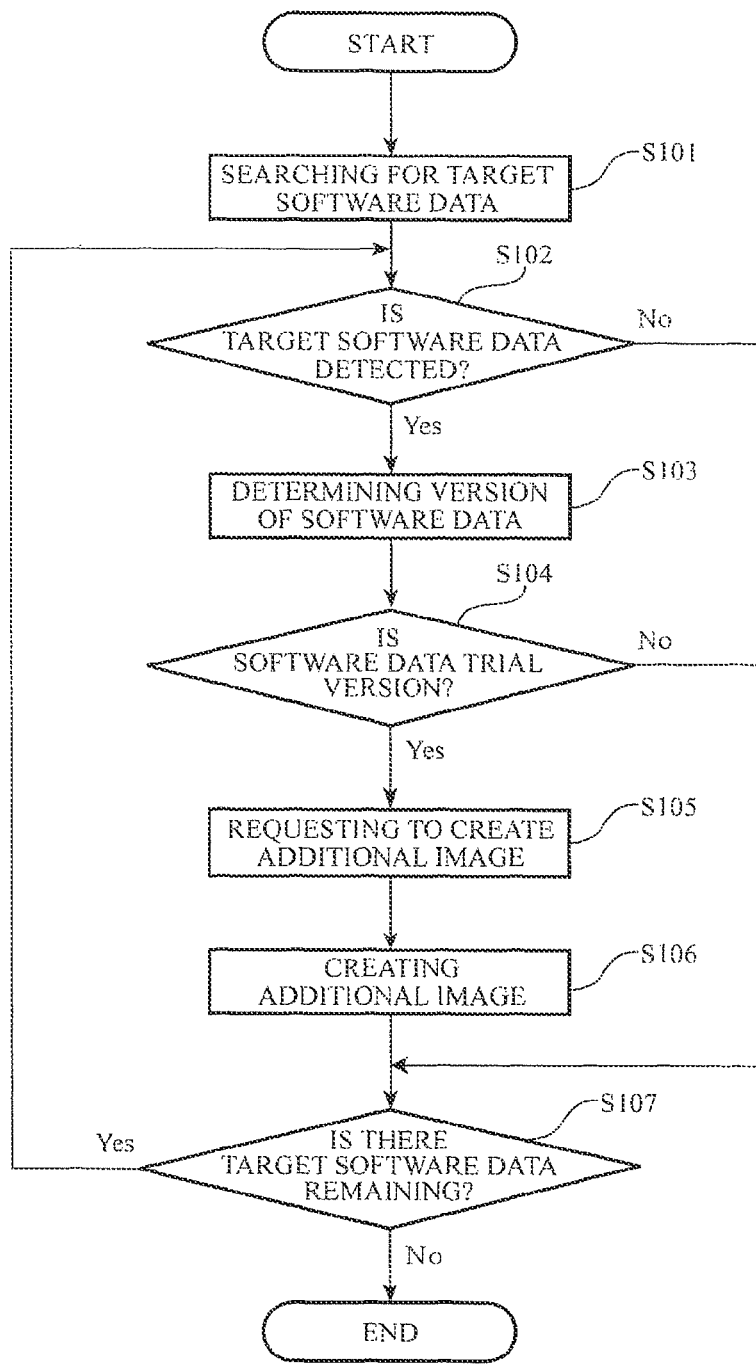
FIG. 6 shows a flowchart illustrating a method of creating a trial-version additional image.

FIG. 6 shows a flowchart illustrating the method of creating the trial-version additional image.

If power to the color printer is turned on, the trial-version information determining unit searches for the target software data (S101). Specifically, the trial-version information determining unit references the trial-version target list to inquire of the download control unit as to whether or not data on the cLUT that is indicated first (ID: 1) is stored in the HDD. Note that the search for the target software data may be performed not only at the power-on time but at another time (for example, at the time of downloading the cLUT).

Here, if the target software data is detected (S102: Yes), the trial-version information determining unit determines whether or not the software data is the trial version (S103).

Specifically, the trial-version information determining unit extracts the version information attached to the software data that is stored in the HDD, and determines that the software data is the trial version if the version information includes identification information unique to the trial-version software data. For example, when it is determined based on the presence/absence of the identification name "TEST" whether or not the software data is the trial version, if the software data with the version information as "ColorTable_TEST1" is detected, it is determined that the software data is the trial-version software data because the version name includes the identification name "TEST".

If it is determined that the detected software data is the trial version (S104: Yes), the additional image creating unit requests the drawing processing unit to create the additional image regarding the trial-version software data (S105).

Specifically, the additional image creating unit adds information with "PRESENCE" as the presence/absence of trial version and "ColorTable_TEST1" as the version name to the additional information for trial-version printing, and sends the request to create the additional image to the drawing processing unit along with the above-mentioned information.

When the request to create the additional image is received from the additional image creating unit, the drawing processing unit creates the bitmapped image of the additional image regarding the trial-version software data based on the additional information for trial-version printing that has been received along with the request notification (S106).

Specifically, the drawing processing unit creates the additional image by preparing as an object image the character string in the version name based on the font information within the additional information for trial-version printing and locating the object image based on the printing position.

Note that the drawing processing unit stores the created additional image in a specific area of the drawing memory, and adds a storage destination address thereof to the additional information for trial-version printing as an additional image address.

Then, the trial-version information control unit confirms whether or not there any target software data remains (S107).

If it is confirmed in Step S102 that there is no target software data (S102: No) or if it is determined in Step S104 that the software data is not the trial version (S104: No), the procedure advances to Step S107.

If there is target software data remaining (S107: YES), the procedure returns to Step S102, and the same processing is performed on the remaining target software data. In this embodiment, ID: 1 (cLUT) and ID: 2 (screen pattern) are shown in the trial-version target list, and hence the processing of Steps S101 to S106 is performed on the trial-version screen pattern after creation of the additional image for the cLUT.

Figure 7:
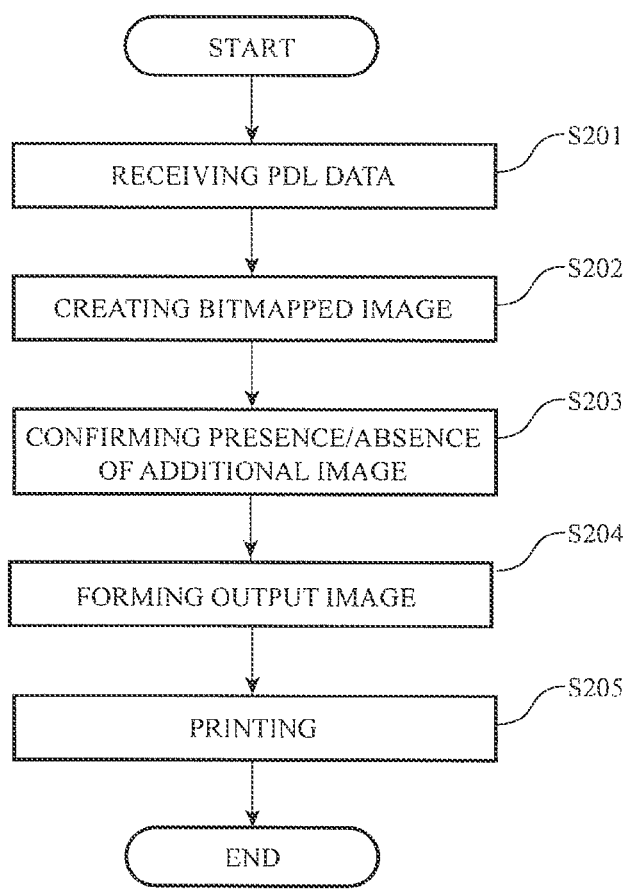
FIG. 7 shows a flowchart illustrating a printing method according to the embodiment of the present disclosure.
Figure 8:
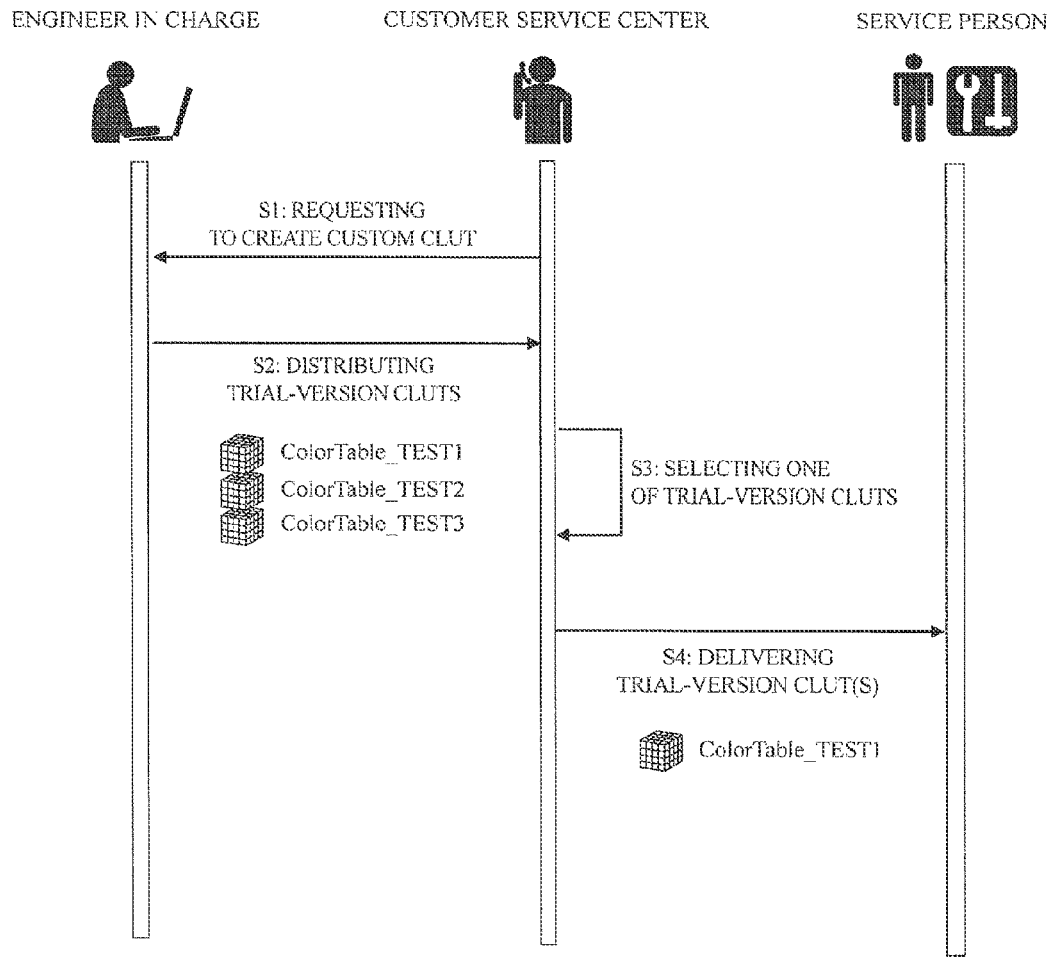
FIG. 8 illustrates a flow in delivery of the trial-version cLUT.

FIG. 7 shows a flowchart illustrating the printing method according to the embodiment of the present disclosure.

As illustrated in FIG. 7, first, the PDL receiving unit receives the PDL data from the personal computer or the like in the external portion (S201).

Further, the PDL receiving unit performs a command analysis of the received PDL data. The PDL receiving unit issues a request for drawing to the drawing processing unit if a drawing command is detected as a result of the command analysis.

Subsequently, the drawing processing unit creates the bitmapped image based on the PDL data according to the drawing command requested by the PDL receiving unit (S202). The drawing processing unit stores the bitmapped image created based on the PDL data in the drawing memory.

Subsequently, the composite image creating unit confirms the presence/absence of the additional image (S203).

Specifically, the output image forming unit makes an inquiry of the trial-version information control unit, and the trial-version information control unit confirms the presence/absence of the additional image based on the information included in the presence/absence of trial version of the additional information for trial-version printing.

Then, if "PRESENCE" is confirmed in the presence/absence of trial version, the trial-version information control unit notifies the composite image creating unit of the information included in the additional image address of the additional information for trial-version printing.

Subsequently, the composite image creating unit forms an output image (S204).

Specifically, the composite image creating unit extracts the bitmapped image for the additional image and the bitmapped image based on the PDL data from the drawing memory based on the "additional image address" of which the trial-version information control unit provided notification. The composite image creating unit composites the bitmapped image for the additional image and the bitmapped image based on the PDL data that have been extracted from the drawing memory.

Further, the output image forming unit creates a final output image by subjecting the composite image to the color conversion processing and the screen processing by using the trial-version cLUT and screen pattern that are stored in the HDD.

On the other hand, without the additional image, the composite image creating unit creates the final output image by subjecting the bitmapped image formed of only the PDL data to the color conversion processing and the screen processing by using the original cLUT or the like.

The composite image creating unit outputs the final output image to the printing unit.

The printing unit performs the printing processing based on the final output image (S205).

Accordingly, as illustrated in FIG. 5A, if the target trial-version software data has been downloaded, it is possible to deliver a print result in which the original image based on the PDL data and the additional image indicating the trial-version software data are composited.

As described above, according to the color printer of this embodiment, it is determined whether or not the specific software data such as the trial-version cLUT or screen pattern has been downloaded. If it is determined that the specific software data has been downloaded, it is possible to explicitly display the outline of the software data as the additional image on printed matter.

Therefore, it is possible to eliminate the time and labor associated with managing downloaded trial-version cLUTs or screen patterns.

Specifically, even if a service person (or another concerned person) who has downloaded the trial-version cLUT or the like does not make a report thereon and forgets which of the trial-version cLUTs has been introduced, it is possible to recognize the cLUT in use by viewing the printed matter.

Further, it is possible to prompt a user to upgrade to the full version by visualizing the trial-version cLUT or the like.

In addition, the version name of the trial-version cLUT or the like is explicitly displayed by printing, and hence it is possible to easily perform a comparison of printed states without separately performing work for recognizing the version.

In addition, even when a plurality of software data is delivered as the trial-version cLUT or the like, it is possible to prevent abuse thereof because the printing is set to be performed with only the existing cLUT or the like.

The image forming apparatus according to the embodiment of the present disclosure has been described above, but the image forming apparatus according to the present disclosure is not limited to the above-mentioned embodiment, and various modifications can naturally be made within the scope of the present disclosure.

For example, this embodiment is described by assuming the trial-version cLUT or screen pattern as the target, but even in a case of software data used for a purpose other than the trial, management thereof can be assisted. Further, the present disclosure can naturally be carried out when downloading either the trial-version cLUT or the trial-version screen pattern.

Further, the image forming apparatus according to the present disclosure is not limited to a color printer, and may be a copier or a multifunction peripheral (MFP). Further, the image forming apparatus according to the present disclosure may have an inkjet mechanism.

Note that all or a part of the image forming program is provided by, for example, a magnetic disk, an optical disc, a semiconductor memory, and other such arbitrary non-transitory computer-readable recording medium, and the image forming program read from the recording medium is installed on the computer to be executed. Further, the image forming program may be executed by being loaded onto the computer directly via a communication line without the intermediation of the recording medium.

The present disclosure can be applied to any image forming apparatus that can perform an image processing based on a cLUT or screen pattern that has been downloaded.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus, comprising:
   an additional image creating unit configured to create an additional image by using information associated with externally acquired software data if the externally acquired software data comprises specific software data;

a composite image creating unit configured to create a composite image in which the additional image and an original image are composited; and a printing unit configured to print the composite image.

2. The image forming apparatus according to claim 1, further comprising:

a unique information storage unit configured to store unique information to the specific software data; and a specific data determining unit configured to determine whether or not the externally acquired software data is the specific software data depending on whether or not the unique information is associated with the externally acquired software data, wherein the additional image creating unit is further configured to create the additional image by using the unique information associated with the externally acquired software data if the specific data determining unit determines that the externally acquired software data is the specific software data.

3. The image forming apparatus according to claim 2, wherein the unique information is included in version information on the externally acquired software data.

4. The image forming apparatus according to claim 1, further comprising an image processing unit configured to carry out an image processing by using the externally acquired software data if the externally acquired software data is the specific software data.

5. The image forming apparatus according to claim 4, wherein:

the specific software data includes at least one of a specific color look-up table and a specific screen pattern; and the image processing includes at least one of a color conversion processing and a screen processing.

6. The image forming apparatus according to claim 5, wherein:

the specific color look-up table includes a trial-version color look-up table; and the specific screen pattern includes a trial-version screen pattern.

7. The image forming apparatus according to claim 1, further comprising an original image creating unit configured to create the original image.

8. A non-transitory computer-readable recording medium that stores an image forming program code executed by a computer of an image forming apparatus, the image forming program code comprising:

a first sub-program code for causing the computer to create an additional image by using information associated with externally acquired software data if the externally acquired software data comprises specific software data;

a second sub-program code for causing the computer to create a composite image in which the additional image and an original image are composited; and a third sub-program code for causing the computer to print the composite image.

9. The non-transitory computer-readable recording medium according to claim 8, wherein:

the image forming program code further comprises:

a fourth sub-program code for causing the computer to store unique information to the specific software data; and a fifth sub-program code for causing the computer to determine whether or not the externally acquired software data is the specific software data depending on whether or not the unique information is associated with the externally acquired software data; and the first sub-program code further causes the computer to create the additional image by using the unique information associated with the externally acquired software data if it is determined according to the fifth sub-program code that the externally acquired software data is the specific software data.

10. The non-transitory computer-readable recording medium according to claim 9, wherein the unique information is included in version information on the externally acquired software data.

11. The non-transitory computer-readable recording medium according to claim 8, wherein the image forming program code further comprises a sixth sub-program code for causing the computer to carry out an image processing by using the externally acquired software data if the externally acquired software data is the specific software data.

12. The non-transitory computer-readable recording medium according to claim 11, wherein:

the specific software data includes at least one of a specific color look-up table and a specific screen pattern; and the image processing includes at least one of a color conversion processing and a screen processing.

13. The non-transitory computer-readable recording medium according to claim 12, wherein:

the specific color look-up table includes a trial-version color look-up table; and the specific screen pattern includes a trial-version screen pattern.

14. The non-transitory computer-readable recording medium according to claim 8, wherein the image forming program code further comprises a seventh sub-program code for causing the computer to create the original image.

15. An image forming method, comprising:

an additional image creating unit creating an additional image by using information associated with externally acquired software data if the externally acquired software data is specific software data;

a composite image creating unit creating a composite image in which the additional image and an original image are composited; and a printing unit printing the composite image.

16. The image forming method according to claim 15, further comprising:

a unique information storage unit storing unique information to the specific software data; and a specific data determining unit determining whether or not the externally acquired software data is the specific software data depending on whether or not the unique information is associated with the externally acquired software data, wherein the additional image creating unit further creates the additional image by using the unique information associated with the externally acquired software data if it is determined by the specific data determining unit that the externally acquired software data is the specific software data.

17. The image forming method according to claim 16, wherein the unique information is included in version information on the externally acquired software data.

18. The image forming method according to claim 15, further comprising an image processing unit carrying out an image processing by using the externally acquired software data if the externally acquired software data is the specific software data.

19. The image forming method according to claim 18, wherein:

the specific software data includes at least one of a specific color look-up table and a specific screen pattern; and the image processing includes at least one of a color conversion processing and a screen processing.

20. The image forming method according to claim 19, wherein:

the specific color look-up table includes a trial-version color look-up table; and the specific screen pattern includes a trial-version screen pattern.

21. The image forming method according to claim 15, further comprising an original image creating unit creating the original image.

* * * * *